United States Patent [19]
Robinson, Jr.

[11] Patent Number: 5,111,344
[45] Date of Patent: May 5, 1992

[54] CERAMIC-COATED MICROSCOPE SLIDE

[75] Inventor: E. H. Robinson, Jr., Harriman, Tenn.

[73] Assignee: Chase Instruments Corp., Norcross, Ga.

[21] Appl. No.: 367,484

[22] Filed: Jun. 16, 1989

[51] Int. Cl.$^5$ .............. G02B 1/00; G02B 21/26; B32B 3/00
[52] U.S. Cl. .................... 359/900; 359/391; 428/206
[58] Field of Search .............. 350/525-530, 350/529-536; 428/204, 208, 210, 191, 206; 118/641, 671, 620; 356/44; 427/139; 501/118; 65/133; 359/391-398, 900

[56] References Cited

U.S. PATENT DOCUMENTS

| | | | |
|---|---|---|---|
| 3,705,050 | 12/1972 | Smith | 428/210 |
| 4,087,154 | 5/1978 | Menzel | 350/534 |
| 4,267,209 | 5/1981 | Hanson | 428/207 |
| 4,290,533 | 9/1981 | Rupp et al. | 215/1 R |
| 4,481,246 | 11/1984 | Melisz et al. | 428/210 |
| 4,624,882 | 11/1986 | Melisz et al. | 428/210 |
| 4,679,914 | 7/1987 | Rosenberg | 350/534 |

FOREIGN PATENT DOCUMENTS 729927 11/1980 U.S.S.R. .

Primary Examiner—Rodney B. Bovernick
Assistant Examiner—Thong Nguyen
Attorney, Agent, or Firm—Robert S. Stoll

[57] ABSTRACT

A glass microscope slide made of low annealing temperature glass and having an opaque, porous, ceramic marking surface permanently fused thereto, and a method for making same. The ceramic marking surface may be formed on one side or on both sides of the glass microscope slide and at either end on either side. Different ceramic colors may be used for color coding the slide.

10 Claims, 2 Drawing Sheets

CERAMIC-COATED MICROSCOPE SLIDE

BACKGROUND OF THE INVENTION

1. Field of the Invention

Microscope slides having marking surfaces adapted for marking by pen, pencil or other marking means.

2. Description of the Prior Art

The following list of the U.S. Pat. Nos. comprises the closest prior art known to applicant:

| | |
|---|---|
| 3,705,050 | Smith |
| 4,087,154 | Menzel |
| 4,290,533 | Rupp et al. |
| 4,481,246 | Melisz et al |
| 4,624,882 | Melisz et al |
| 4,679,914 | Rosenberg |

The problem with the epoxy resin type of marking surface, as exemplified by the above-cited Melisz et al. and Rosenberg patents, is that it is not permanently secured to the glass slide. This is equally true of polytetrafluoroethylene coatings that are similarly used as marking surfaces on microscope slides. In both cases, the coatings are vulnerable to chemical or mechanical factors that may detach the coatings from the slides. Additionally, the markings on such marking surfaces may in some cases rub off or erode, preventing their use as permanent records. Moreover, specimens on the slides, e.g., blood smears, may be subject to contamination from dislodged particles of the epoxy resin.

Conventional microscope slide marking surfaces that are permanent ("frosted" marking surfaces) are those formed by sandblasting, acid etching, mechanical abrading, or other surface roughening methods. Such frosted marking surfaces are formed in the glass itself and, consequently are permanently incorporated therein. But they have disadvantages that may outweigh the advantage of their permanence. Thus, they do not provide good writing surfaces and they require opaque backgrounds for visual contrast. Such backgrounds take the form of opaque coatings applied to the reverse side of the slides behind the frosted marking surfaces. The problem of permanence is thereby transferred from the marking surfaces to the background coatings.

The background coatings add the economic disadvantage of an additional material and an additional manufacturing operation that provide no useful function except to improve the functioning of the frosted marking surfaces.

The closest of the above-cited patent art is the Smith U.S. Pat. No. 3,705,050. Smith discloses a method of producing a vitreous enamel marking surface on laboratory glassware "including beakers, flasks, test tubes, culture tubes, Petri dishes, etc." (column 1, lines 34-35). It is noted that these are all curved shapes and that glass distortion is no serious problem with respect to laboratory glassware of the kind specified. But glass distortion is impermissible in microscope slides.

Specifically, the Smith patent is concerned with high annealing temperature glass (borosilicate) and high firing temperature vitreous enamels. The borosilicate glass in Smith's examples has an annealing temperature range of 1030-1050 degrees F. (column 5, lines 29-37). The vitreous enamels mentioned have firing temperatures ranging upwardly from 900 degrees F. (column 5, lines 38-40). The vitreous enamels are fused onto the borosilicate surface in an annealing lehr maintained at a temperature range of about 1030 to 1050 degrees F. (column 4, lines 72-75), the annealing temperature range of the borosilicate glass. A microscope slide, exposed to this temperature range, would change shape.

Smith relies on polytetrafluoroethylene (sold under the duPont trademark Teflon) for the formation of a marking surface capable of accepting pencil and other markings. When the vitreous enamel is softened and fused onto the borosilicate glass the Teflon decomposes, yielding a gas that passes through the vitreous enamel, producing crevices, pinholes and protuberances that provide a roughened marking surface (column 5, lines 1-5). None of this is involved in the present invention.

SUMMARY OF THE INVENTION

The principal object of this invention is a microscope slide made of microscope quality glass, with a marking surface on at least one side thereof that is inherently opaque and porous (matte), and constitutes an integral and inseparable part of the glass. No opaque background coating on the reverse side of the glass slide is required for visual contrast.

This object is attained by using opaque ceramic material for the marking surface, softening the surface of the glass slide at an elevated temperature approximating the glass annealing temperature, and fusing the ceramic material to the softened glass surface. The marking surface is the natural porous surface of the fused ceramic material itself, resulting entirely from the use of the materials and process herein described. Unlike the Smith patent, no Teflon or other gas-generating additive is used in the present invention to form crevices, pinholes or protuberances on the marking surface.

And, unlike the microscope slides that have sandblasted, acid etched or abraded marking surfaces that are not opaque, the opaque ceramic marking surface of the present invention requires no opaque background coating on the reverse side of the slide for visual contrast.

Another object of the present invention is a microscope slide having a marking surface that can be color coded by means of permanent coloring that is an integral part of the marking surface. This objective is attained by the use of ceramic coloring additives that are included in the ceramic material of which the marking surface is made. The same porous surface is produced as without the coloring additives.

DESCRIPTION OF PREFERRED EMBODIMENTS OF THE INVENTION

Figure 1:
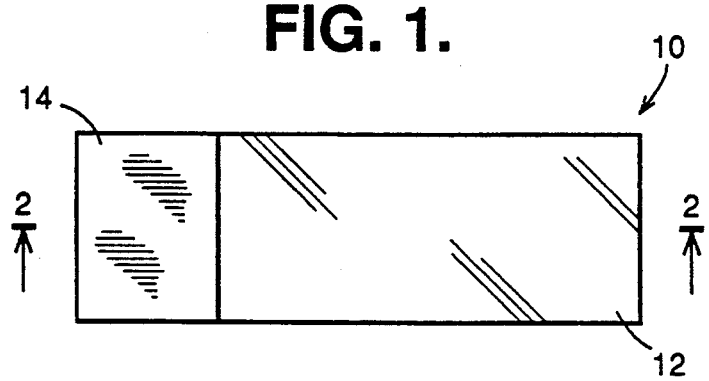
FIG. 1 is a plan view of a microscope slide 10 made in accordance with this invention, said microscope slide 10 having a single ceramic marking surface 14 fused to one side thereof.
Figure 2:
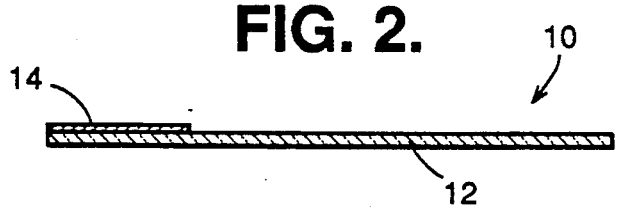
FIG. 2 is a longitudinal section on the line 2—2 of FIG. 1.
Figure 3:
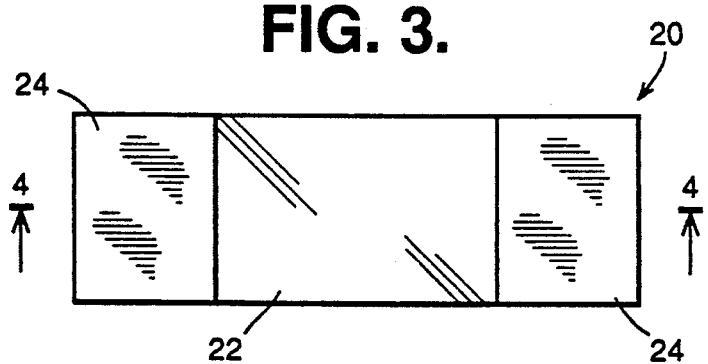
FIG. 3 is a plan view of a microscope slide 20 made in accordance with this invention, said microscope slide 20 having two ceramic marking surfaces 24 fused to one side thereof, one ceramic marking surface 24 at each end of said microscope slide.
Figure 4:
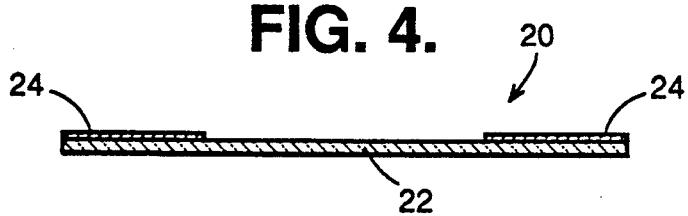
FIG. 4 is a longitudinal section on the line 4—4 of FIG. 3.
Figure 5:
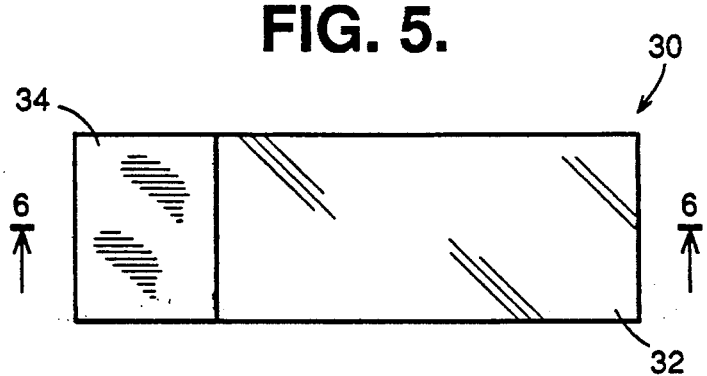
FIG. 5 is a plan view of a microscope slide 30 made in accordance with this invention, said microscope slide 30 having two ceramic marking surfaces 34 fused thereto, one on each side thereof, both at one end thereof.
Figure 6:
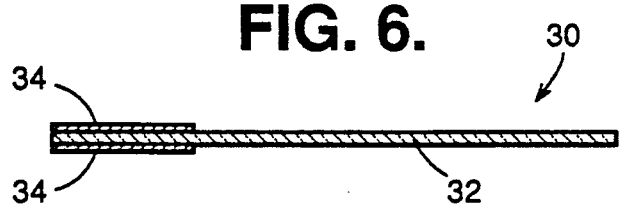
FIG. 6 is a longitudinal section on the line 6—6 of FIG. 5.
Figure 7:
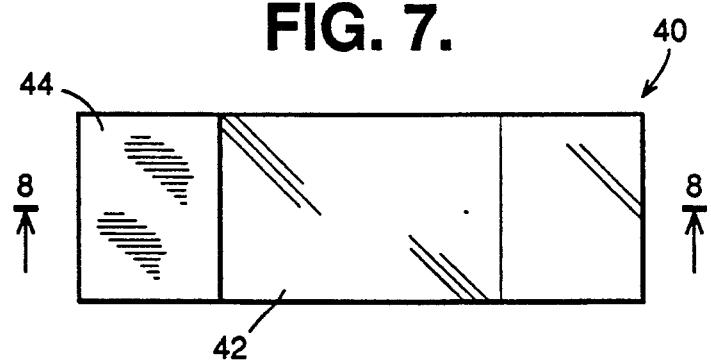
FIG. 7 is a plan view of a microscope slide 40 made in accordance with this invention, said microscope slide 40 having two ceramic marking surfaces 44 fused thereto, one on each side and end thereof.
Figure 8:
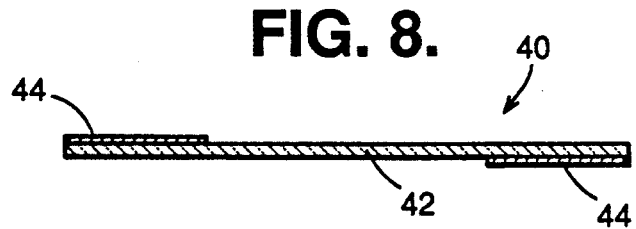
FIG. 8 is a longitudinal section on the line 8—8 of FIG. 7.

The present invention relates to microscope slides 10 made of standard microscope slide glass 12 specifically, but not limited to, soda lime glass designated Type III in the United States Pharmacopoeia and National Formulary. The soda lime glass used herein has an annealing temperature of approximately 962 degrees F.

The invention requires opaque ceramic material 14 having a firing temperature compatible with the annealing temperature of glass 12. The following ceramic formulations, with the addition of a conventional carrier oil such as pine oil, produce an excellent ceramic paint having a compatible firing temperature ranging from approximately 875 degrees F. to approximately 900 degrees F. which, it is noted, is below the annealing temperature of the glass:

| Ceramic Paint (Frit alone) (approximate percentages by weight) | |
|---|---|
| Litharge | 51–61% |
| Flint | 6–8.5% |
| Cadmium Oxide | 4–6.5% |
| Boric Acid | 15.5–19.5% |
| Zinc Oxide | 3–4% |

| Ceramic Paint (Frit and Coloring) (approximate percentages by weight) | | | |
|---|---|---|---|
|  | RED | PINK | WHITE |
| Frit: | | | |
| Litharge | 56–60% | 56–60% | 51–55% |
| Flint | 6.5–8.5% | 6.5–8.5% | 6–8% |
| Cadmium Oxide | 4.5–6.5% | 4.5–6.5% | 4–6% |
| Boric Acid | 17.5–19.5% | 17.5–19.5% | 15.5–17.5% |
| Zinc Oxide | 3–4% | 3–4% | 3–4% |
| Coloring: | | | |
| Titanium Dioxide | 3–4% | 5–6.5% | 15.5–17.5% |
| Cadmium Selenium Oxide | 3–4% | .2–.4% | |
| Chrome, Iron, Zinc Antimony Oxide | .5–1% | - | |

|  | YELLOW | GREEN | BLUE | ORANGE | BROWN |
|---|---|---|---|---|---|
| Frit: | | | | | |
| Litharge | 56–60% | 56–60% | 56–60% | 56–60% | 56–60% |
| Flint | 6.5–8.5% | 6.5–8.5% | 6.5–8.5% | 6.5–8.5% | 6.5–8.5% |
| Cadmium Oxide | 4.5–6.5% | 4.5–6.5% | 4.5–6.5% | 4.5–6.5% | 4.5–6.5% |
| Boric Acid | 17.5–19.5% | 17.5–19.5% | 17.5–19.5% | 17.5–19.5% | 17.5–19.5% |
| Zinc Oxide | 3–4% | 3–4% | 3–4% | 3–4% | 3–4% |
| Coloring: | | | | | |
| Titanium Dioxide | 2.5–3.5% | 6–8% | 3–4% | 2–3% | 1.5–2.5% |
| Cadmium Oxide | 2.5–3.5% | | | | |
| Cobalt Chrome Zinc Alumina Oxide | | 1–2% | 2–3% | | |
| Chrome Titanium Antimony Oxide | | .2–.4% | | | |
| Cobalt Chrome Iron Oxide | | .2–.3% | | | |
| Cobalt Alumina Zinc Oxide | | | 2–3% | | |
| Chrome Iron Zinc Silica Oxide | | | | 2–3% | |
| Cadmium Selenium Oxide | | | | .3–.5% | |
| Chrome Iron Zinc Oxide | | | | | 4.5–6.5% |

The frit can be used alone, that is, without coloring agents, combined in conventional manner with a carrier oil to form a flowable paint capable of printing through a silk screen. The color of the resulting product will be a shade of white, although not the controlled white that white coloring agents produce.

The process for using the foregoing materials in the making of ceramic-coated microscope slides 10 follows:
1. Plain microscope glass slides are washed and dried preparatory to the printing step. The washing and drying procedures and equipment are conventional.
2. The washed and dried slides are printed in their marking areas with ceramic paint made in accordance with the above formulations and applied through a silk screen.

3. The next step is another drying step wherein the ceramic paint is dried at a slow pace to allow the carrier oil to escape from the paint. Any conventional drying method and means may be used, e.g., strip heaters or hot air blowers. This step should take about one minute in a 350 degree F. oven. The resulting product is a microscope slide with a ceramic coating free of extraneous material.

4. The next step is the crucial firing step that fuses the ceramic coating into the glass slides. In this step, the ceramic-coated slides are heated to a temperature and for a time that would soften the surface of the glass slides and fire the ceramic coating to the point that the coating will fuse into the softened glass and produce a porous, matte ceramic surface. Excessive heat or excessive exposure to the heat could glaze the ceramic surface and destroy its porosity.

Specifically, the ceramic-coated glass slides are heated in an oven where the ceramic is fired at a temperature below the effective annealing temperature of the glass. Depending on the color additives, if any, the ceramic firing temperature should range from approximately 875 degrees F. to approximately 900 degrees F. for a long soak time of approximately 12-15 minutes. This oven temperature should be maintained at a uniform level plus or minus 5 degrees F. At these temperature and time ranges, the glass surface softens to the extent necessary to enable the fired ceramic coating to fuse into the glass without distorting it.

Alternatively, the firing temperature of the ceramic may exceed the effective annealing temperature of the glass provided the soak time is reduced to the point, as stated in the preceding paragraph, that the glass surface softens to the extent necessary to enable the fired ceramic coating to fuse into the glass without distorting it. This alternative is based on common knowledge—that temperature and time ranges are usually inversely related, that is, higher temperatures require shorter heating times and lower temperatures require longer heating times.

5. The final step is the cooling of the ceramic-fused glass slides, e.g., about five minutes of slow gradual cooling.

The foregoing illustrates the principles of this invention and it will be apparent to those skilled in the art that the same principles, as herein claimed, are equally applicable to variations in the materials herein set forth, e.g., in the nature of the microscope glass and in the coloring materials.

It will also be understood that the invention may be applied to both sides of a microscope slide to provide a marking surface on each side. A marking surface may be applied to a single end of a microscope slide or to both ends. These variations are for the convenience of the user and are encompassed within the scope of the invention and the appended claims.

I claim:

1. A microscope slide, comprising:
   a. a glass microscope slide made of soda lime glass having an annealing temperature of approximately 962 degrees Fahrenheit;
   b. an opaque ceramic marking surface fused to at least one side of said glass slide;
   c. said ceramic marking surface comprising a ceramic coating which is fusible into the glass slide at firing temperature and heating time ranges at which the glass surface softens to the extent necessary to enable the fired ceramic coating to fuse into the glass without distorting it, and to produce a porous, matte surface.

2. A microscope slide in accordance with claim 1, wherein:
   a. two opaque ceramic marking surfaces are fused to the microscope slide,
   b. one opaque ceramic marking surface on each side thereof.

3. A microscope slide in accordance with claim 1, wherein two opaque ceramic marking surfaces are fused to the microscope slide at opposite ends thereof.

4. A microscope slide in accordance with claim 1, wherein:
   a. The ceramic coating has a firing temperature below the annealing temperature of the glass slide, and
   b. the glass slide has a surface softening temperature corresponding, substantially, to the firing temperature of the ceramic coating,
   c. whereby, at the firing temperature of the ceramic coating and the surface softening temperature of the glass slide, the ceramic coating is adapted to fuse into the surface of the glass slide without distorting the glass.

5. A microscope slide in accordance with claim 4, wherein the ceramic coating has a firing temperature range from about 875 degrees Fahrenheit to about 900 degrees Fahrenheit.

6. A microscope slide in accordance with claim 4 wherein:
   a. the surface softening temperature of the glass slide is within the firing temperature range of the ceramic coating,
   b. said ceramic coating having the following frit formula in approximate percentages by weight:

| Litharge | 51–61% |
| --- | --- |
| Flint | 6–8.5% |
| Cadmium Oxide | 4–6.5% |
| Boric Acid | 15.5–19.5% |
| Zinc Oxide | 3–4%. |

7. A method of making a microscope slide having at least one ceramic marking surface, comprising the steps of:
   a. applying a ceramic coating to a marking area on a soda lime glass microscope slide; and
   b. heating the microscope slide to a temperature and for a time sufficient to soften its surface without distorting the glass,
   wherein the temperature and time are also sufficient to fire the ceramic coating to a point that the ceramic coating will fuse into the softened glass surface and produce a porous, matte ceramic marking surface.

8. The method of claim 7, wherein:
   a. the firing temperature of the ceramic coating ranges from about 875 degrees Fahrenheit to about 900 degrees Fahrenheit, and
   b. said ceramic coating having the following frit formula in approximate percentages by weight:

| Litharge | 51–61% |
| --- | --- |
| Flint | 6–8.5% |

| -continued | |
|---|---|
| Cadmium Oxide | 4–6.5% |
| Boric Acid | 15.5–19.5% |
| Zinc Oxide | 3–4%. |

9. A method of making a microscope slide having at least one ceramic marking surface, comprising the steps of:
   a. applying a ceramic coating to a marking area on a glass microscope slide,
   said ceramic coating having a firing temperature below an annealing temperature of the glass slide,
   said glass slide having a surface softening temperature corresponding, substantially, to the firing temperature of the ceramic coating; and
   b. heating the glass slide together with its ceramic coating at the approximate firing temperature of the ceramic coating to fuse the ceramic coating to the surface of the glass slide,
   the firing temperature of the ceramic coating ranging from about 875 degrees Fahrenheit to about 900 degrees Fahrenheit,
   the annealing temperature of the glass slide being about 962 degrees Fahrenheit,
   the surface softening temperature of the glass slide being within the range of about 875 degrees Fahrenheit to about 900 degrees Fahrenheit, and
   the heating period for the glass slide together with its ceramic coating being approximately 12–15 minutes.

10. A method of making a microscope slide having at least one ceramic marking surface, comprising the steps of:
   a. applying a ceramic coating to a marking area on a glass microscope slide,
   said ceramic coating having a firing temperature below the annealing temperature of the glass slide,
   said glass slide having a surface softening temperature corresponding, substantially, to the firing temperature of the ceramic coating;
   b. heating the glass slide together with its ceramic coating at the approximate firing temperature of the ceramic coating to fuse the ceramic coating to the surface of the glass slide,
   the firing temperature of the ceramic coating ranging from about 875 degrees Fahrenheit to about 900 degrees Fahrenheit,
   the annealing temperature of the glass slide being about 962 degrees Fahrenheit,
   the surface softening temperature of the glass slide being within the range of about 875 degrees Fahrenheit to about 900 degrees Fahrenheit, and
   the heating period for the glass slide together with its ceramic coating being approximately 12–15 minutes; and
   c. slowly cooling the glass slide with its ceramic coating following fusion to prevent distortion of the glass.

* * * * *